(12) United States Patent
Ruben (10) Patent No.: US 7,887,613 B2
(45) Date of Patent: Feb. 15, 2011

(54) VACUUM CLEANER HAVING DIRT COLLECTION VESSEL WITH TOROIDAL CYCLONE

(75) Inventor: Brian K. Ruben, Danville, KY (US)

(73) Assignee: Panasonic Corporation of North America, Secaucus, NJ (US)

(*) Notice: Subject to any disclaimer, the term of this patent is extended or adjusted under 35 U.S.C. 154(b) by 221 days.

(21) Appl. No.: 12/368,524

(22) Filed: Feb. 10, 2009

(65) Prior Publication Data

US 2010/0199617 A1 Aug. 12, 2010

(51) Int. Cl.
*B01D 45/12* (2006.01)
(52) U.S. Cl. .............. 55/343; 55/348; 55/429; 55/457; 55/DIG. 3; 15/350; 15/353
(58) Field of Classification Search ............ 55/343, 55/348, 429, 457, 459.1, DIG. 3; 15/350, 15/353
See application file for complete search history.

(56) References Cited

U.S. PATENT DOCUMENTS

| | | | |
|---|---|---|---|
| 377,992 A | 2/1888 | Davidson | |
| 2,461,395 A | 2/1949 | Psikal | |
| 2,482,166 A | 9/1949 | Gage | |
| 4,801,310 A | 1/1989 | Bielefeldt | |
| 5,904,755 A | 5/1999 | Kanazashi et al. | |
| 6,332,239 B1 | 12/2001 | Dubos et al. | |
| 6,485,536 B1 | 11/2002 | Masters | |
| 6,687,951 B2 | 2/2004 | Illingworth et al. | |
| 6,802,881 B2 | 10/2004 | Illingworth et al. | |
| 7,776,116 B2 * | 8/2010 | Oh et al. | 55/345 |
| 7,794,515 B2 * | 9/2010 | Oh et al. | 55/343 |
| 2006/0230719 A1 | 10/2006 | Han et al. | |

* cited by examiner

*Primary Examiner*—Robert A Hopkins
(74) *Attorney, Agent, or Firm*—King & Schickli, PLLC (57) ABSTRACT

A vacuum cleaner includes a body having a nozzle assembly with a suction inlet and a control assembly including a control stalk. A dirt collection vessel is carried on the body. The dirt collection vessel includes a toroidal cyclone. The toroidal cyclone has an inlet port, a clean air outlet port and a particle outlet provided in a wall of the toroidal cyclone between the inlet and outlet port. A cork screw baffle is received in the toroidal cyclone. The cork screw baffle defines a spiraling air path through the toroidal cyclone. A suction generator, carried on the body, draws the air stream through the dirt collection vessel.

17 Claims, 6 Drawing Sheets

VACUUM CLEANER HAVING DIRT COLLECTION VESSEL WITH TOROIDAL CYCLONE

TECHNICAL FIELD AND INDUSTRIAL APPLICABILITY OF THE INVENTION

The present invention relates generally to the floor care equipment field and, more particularly, to a new and improved vacuum cleaner incorporating a dirt collection vessel having a toroidal cyclone for enhanced cleaning performance.

BACKGROUND OF THE INVENTION

A vacuum cleaner is an electromechanical appliance utilized to effect the dry removal of dust, dirt and other small debris from carpets, rugs, fabrics or other surfaces in domestic, commercial and industrial environments. In order to achieve the desired dirt and dust removal, most vacuum cleaners incorporate a rotary agitator. The rotary agitator is provided to beat dirt and debris from the nap of the carpet or rug while a pressure drop or vacuum is used to force air entrained with this dirt and debris into the nozzle of the vacuum cleaner. The particulate laden air is then drawn into a dirt collection vessel before being directed through the motor of the suction generator to provide cooling. Finally, the air is filtered to remove any fine particles of carbon from the brushes of that motor or other dirt that might remain in the airstream before being exhausted back into the environment.

Dirt collection vessels on vacuum cleaners typically comprise a dirt cup having a cylindrical sidewall, a tangentially directed air inlet for receiving dirt and debris from the nozzle of the vacuum cleaner, and an axially oriented outlet for discharging clean air from the dirt collection vessel. Such a structural arrangement allows for cyclonic air flow in the dirt cup. Such air flow causes dirt and debris to move outwardly toward the side wall of the dirt cup under the centrifugal force generated by the cyclonic air flow. That dirt and debris is then collected in the dirt cup as the clean air is drawn toward and through the axially directed outlet.

In many vacuum cleaners a filter of some type is provided over the discharge outlet to eliminate any dirt and debris not removed from the air stream by the cyclonic air flow. In other, more recent designs, one or more toroidal cyclones are provided to remove any fine dust particles that may have escaped the first or primary cyclone cleaning stage.

The present invention relates to a vacuum cleaner incorporating a dirt collection vessel of novel design that includes a toroidal toroidal cyclone that provides enhanced cleaning performance.

SUMMARY OF THE INVENTION

In accordance with the purposes of the present invention as described herein, an improved vacuum cleaner is provided. That vacuum cleaner includes a body having (a) a nozzle assembly including a suction inlet and (b) a control assembly including a control stock. The vacuum cleaner also includes a dirt collection vessel that is carried on the body. A suction generator carried on the body, draws an air stream through the suction inlet, and the dirt collection vessel.

The dirt collection vessel is characterized by a toroidal cyclone having an inlet, a clean, air outlet port and a particle outlet provided in the toroidal cyclone between the inlet port and the outlet port. Further a corkscrew baffle is received in the toroidal cyclone. The corkscrew baffle defines a spiraling air path through the toroidal cyclone.

Further describing the invention, the dirt collection vessel also includes a second dirt collection chamber in fluid communication with the particle outlet of the toroidal cyclone. The spiraling air path in the toroidal cyclone has a cross sectional area of between about 1.6 cm$^2$ and about 2.2 cm$^2$. In one particularly useful embodiment the vacuum cleaner/dirt collection vessel includes multiple toroidal cyclones. These multiple toroidal cyclones may be provided in parallel, in series or both in parallel and in series.

Each toroidal cyclone extends through an are of between about 60 and about 90 degrees and more typically through an are of between about 85 and about 90 degrees. In one particularly useful embodiment six toroidal cyclones are provided with each of those toroidal cyclones extending through an are of between about 50 and about 60 degrees. The spiral air path of each of the toroidal cyclones has a cross sectional area of between about 1.6 cm$^2$ and about 2.2 cm$^2$. The inlet port of each of the toroidal cyclones has a cross section area of between about 2.7 cm$^2$ and about 3.3 cm$^2$. The outlet port of each of the toroidal cyclones has a cross sectional area of between about 2.7 cm$^2$ and about 3.3 cm$^2$. In addition, the particle outlet of each of the toroidal cyclones has a cross section area of between about 1.0 cm$^2$ and about 2.0 cm$^2$. In yet another alternative embodiment the cross sectional area of the spiraling air path decreases from the inlet port to the outlet port of each of the toroidal cyclones.

In yet another possible embodiment the multiple toroidal cyclones include a first group of toroidal cyclones provided in parallel with one another and a second group of toroidal cyclones provided in parallel with one another but in series with the first group of toroidal cyclones. The spiral air path of each of the first group of toroidal cyclones has a cross sectional area $A_1$ and the spiral air path of each of the second group of toroidal cyclones has a cross sectional area $A_2$ where $A_1$ is greater than $A_2$.

In the following description there is shown and described multiple embodiments of the invention, simply by way of illustration of some of the modes best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Reference will now be made in detail to the present invention, examples of which are illustrated in the accompanying drawings.

DETAILED DESCRIPTION OF THE PREFERRED EMBODIMENTS OF THE INVENTION

Figure 1:
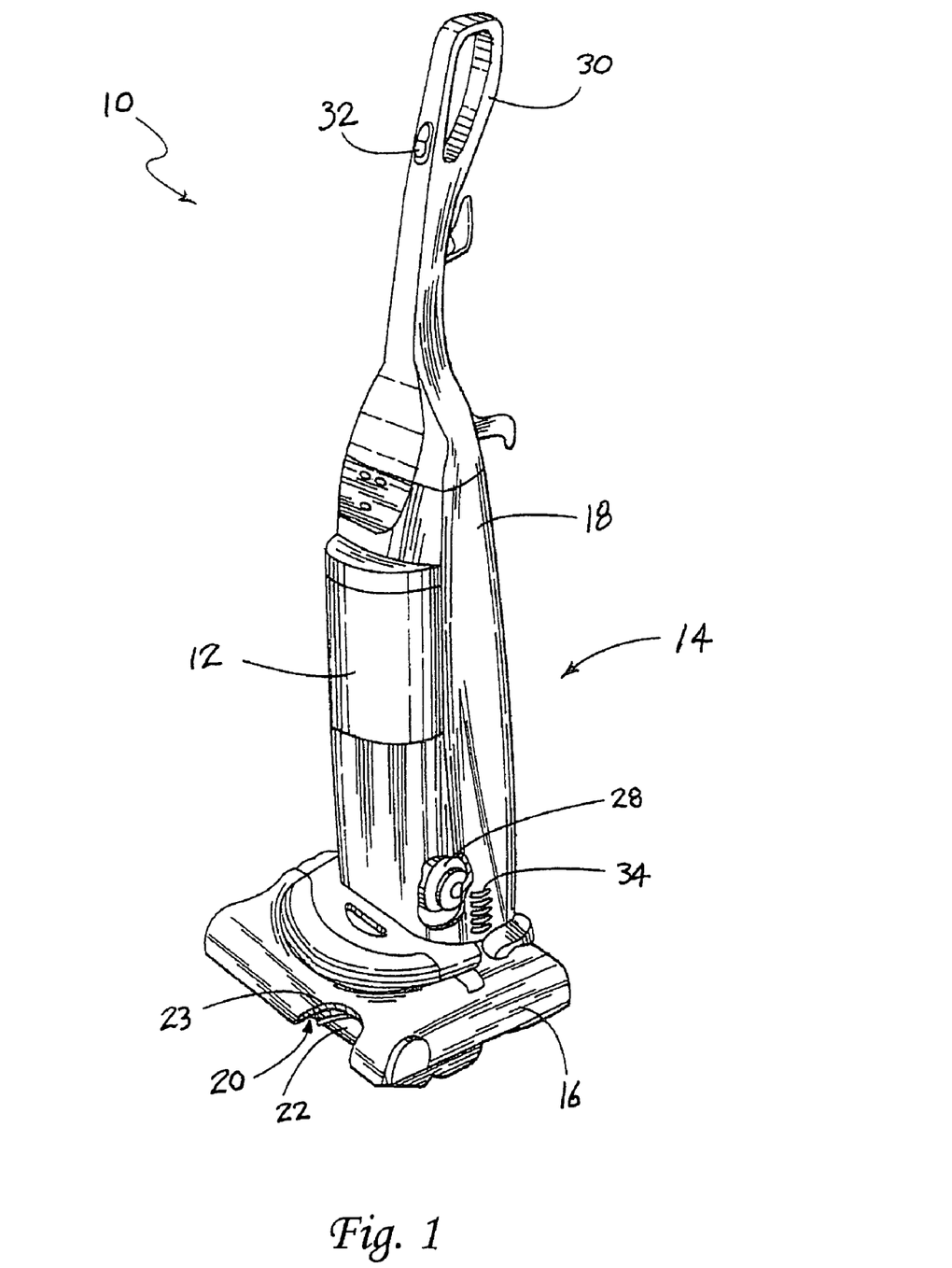
FIG. 1 is a perspective view of an upright vacuum cleaner incorporating the novel dirt collection vessel of the present invention.

Reference is now made to FIG. 1 illustrating an upright vacuum cleaner 10 incorporating the novel dirt collection vessel 12 of the present invention. The vacuum cleaner 10 includes a body, generally designated by reference numeral 14. The body 14 includes a nozzle assembly 16 and a control assembly 18. As is known in the art, the control assembly 18 is pivotally connected to the nozzle assembly 16 to aid the operator in manipulating the vacuum cleaner 10 back and forth across the floor. Wheels (not shown) carried on the body 14 allow the vacuum cleaner 10 to be moved smoothly across the floor. As illustrated, the nozzle assembly 16 is equipped with a suction inlet 20. A rotary agitator 22, including bristle tufts, wipers or cleaning ribs 23, is mounted on the nozzle assembly 16 and extends across the suction inlet 20. The rotary agitator 22 rotates relative to the nozzle assembly 16 in a manner well known in the art.

The control assembly 18 carries a suction generator 28 (i.e. a fan and motor assembly) and the collection vessel 12. The details of the dirt collection vessel will be described in greater detail below. The control assembly 18 also includes a control stalk 30 and an actuator switch 32 for turning the vacuum cleaner 10 on and off. The vacuum cleaner 10 may be powered by electricity from an electrical wall outlet through a power cord (not shown) or by means of an onboard battery.

In operation, the rotary agitator 22 quietly and efficiently brushes dirt and debris from the nap of an underlying carpet. That loosened dirt and debris is first drawn into the suction inlet 20 before being delivered to the dirt collection vessel 12 by means of the suction generator 28. Dirt and debris is trapped in the dirt collection vessel 12 and the now clean air is directed over the motor of the suction generator 28 to provide cooling before being exhausted into the environment through the exhaust vent or port 34.

A first embodiment of the dirt collection vessel 12 is illustrated in FIGS. 2, 3 and 4A-4C. The dirt collection vessel 12 includes an inlet manifold 69 having a chamber 71 and an inlet port 73 in communication with the suction inlet 20 on the nozzle assembly 16 (see action arrow A). The dirt collection vessel 12 also includes a toroidal cyclone 70 having an inlet port 74 in communication with the inlet manifold chamber 71, a clean air outlet port 76 and a particle outlet 78 provided in the wall 72 of the toroidal cyclone between the inlet port and outlet port.

In the particular embodiment illustrated in FIGS. 2, 3 and 4A-4C, four toroidal cyclones 70 are provided in parallel with each receiving a portion of the air stream drawn by the suction generator 28 through the suction inlet 20. Each of the toroidal cyclones 70 extends through an arc of between about 80 and about 90 degrees. It should be appreciated that as few as one and as many as six toroidal cyclones 70 may be provided in parallel. Each of those toroidal cyclones 70 may extend through an arc of from 60 to almost 360 degrees but typically extend through an arc of between about 50 and about 90 degrees.

Figure 2:
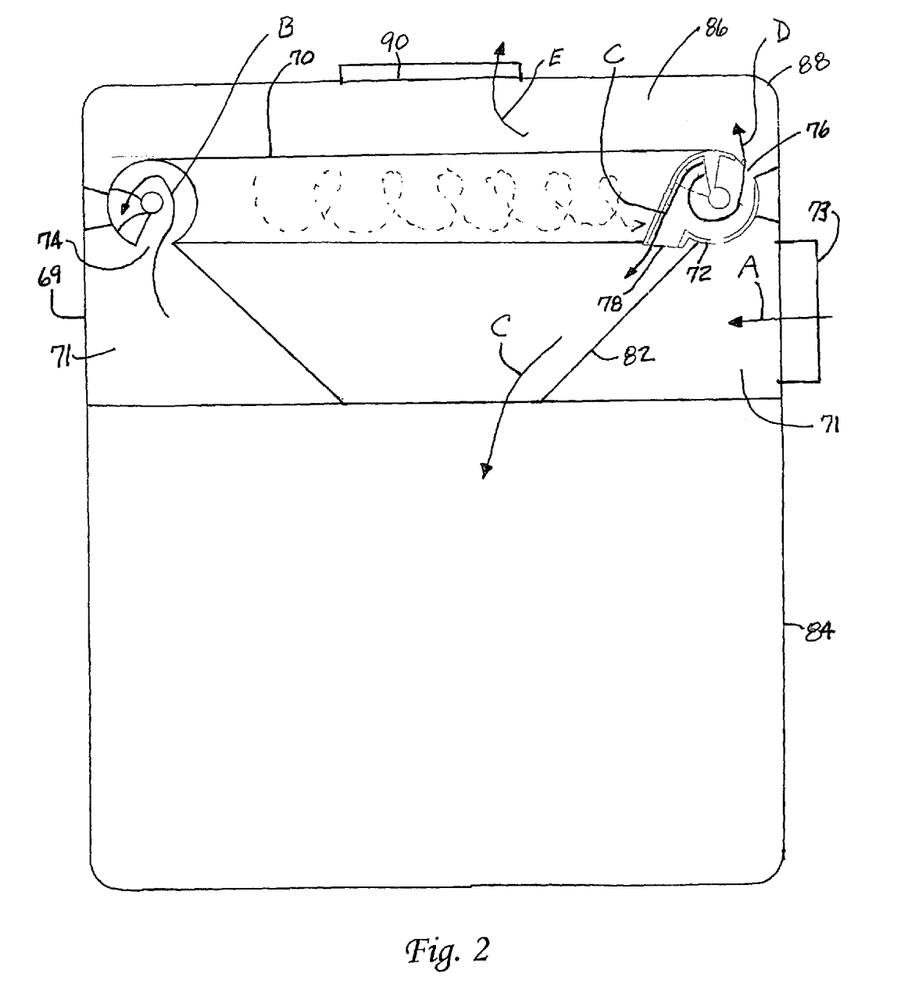
FIG. 2 is a detailed partially schematical side elevational view of the dirt collection vessel of the present invention.
Figure 3:
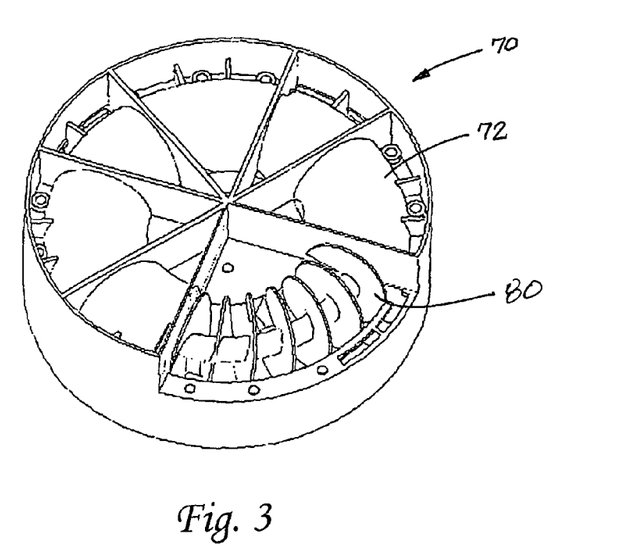
FIG. 3 is a partially broken away, detailed perspective view of the toroidal body cyclones of the dirt collection vessel illustrated in FIG. 2.
Figure 4A:
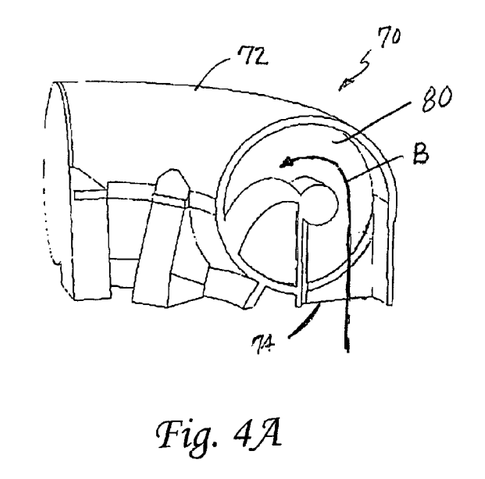
FIGS. 4A-4C are schematical cross sectional illustrations of the movement of air through one toroidal body section of the dirt collection vessel.
Figure 4B:
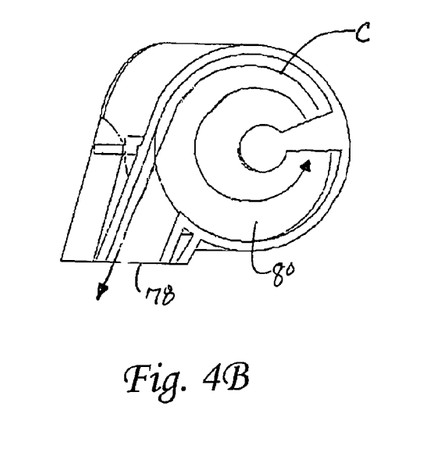
Figure 4C:
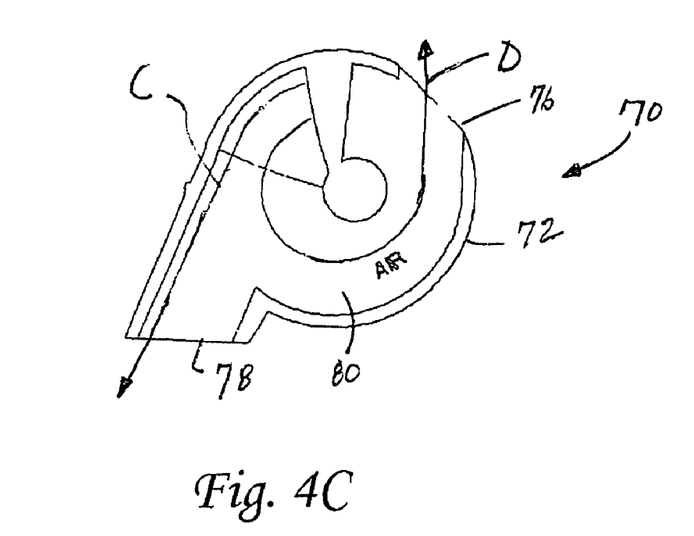

As best illustrated in FIGS. 2 and 3, a cork screw baffle 80 is received in each of the toroidal cyclones 70. The cork screw baffle 80 cooperates with the tubular side wall 72 of the toroidal cyclone 70 to define a spiral air path through the toroidal cyclone. More specifically, a portion of the air stream is delivered from the inlet manifold chamber 72 to the inlet port 74 of each toroidal cyclone (see action arrow B). That air then passes along the spiral air path provided within the toroidal cyclone 70 by the cork screw baffle 80. As the air stream spirals along that air path (see phantom line action arrow), centrifugal force is generated. That centrifugal force forces any fine dust particles in the air stream toward the wall 72 of the toroidal cyclone 70 and those particles are then directed through the particle outlet 78 (note action arrows C) with those particles being delivered through a chute 82 for collection in the dirt collection chamber 84.

In contrast, the air stream, now clean of fine particle contaminants, passes through the outlet port 76 into the chamber 86 of the discharge manifold 88 (see action arrow D). The air stream then passes through the discharge orifice 90 whereby it leaves the dirt collection vessel 12 (see action arrow E). From there the air stream is drawn along duct work (not shown) to the suction generator 28. The clean air stream then passes over the motor of the suction generator 28 to provide cooling before being exhausted through a final filter (not shown) and then past the exhaust vent 34 whereby it is returned to the environment.

Figure 5:
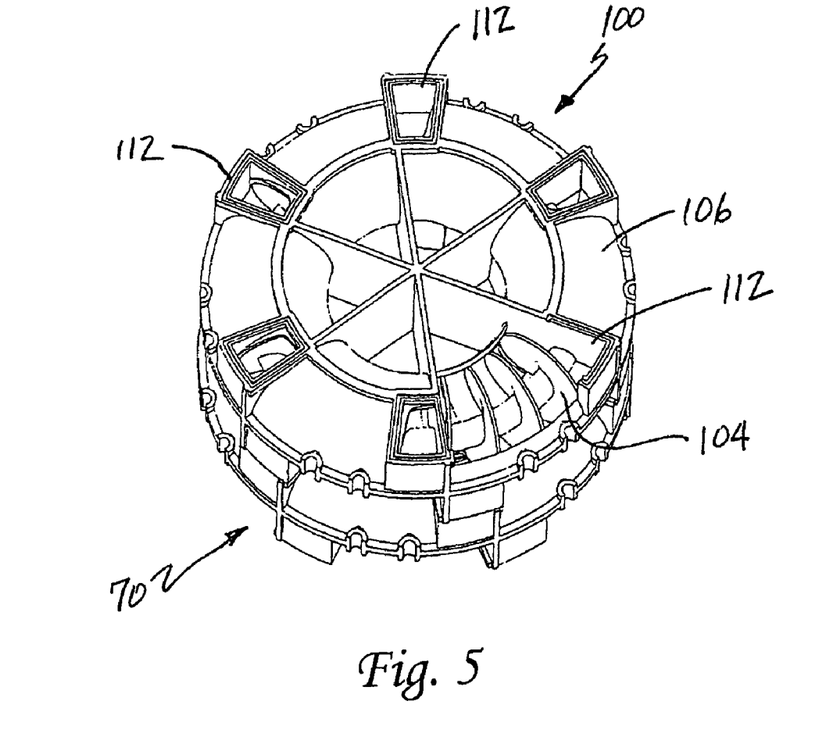
FIG. 5 is a side elevational view of an alternative embodiment of the dirt collection vessel of the present invention including two groups of toroidal cyclones with the second group provided in series with the first group.
Figure 6A:
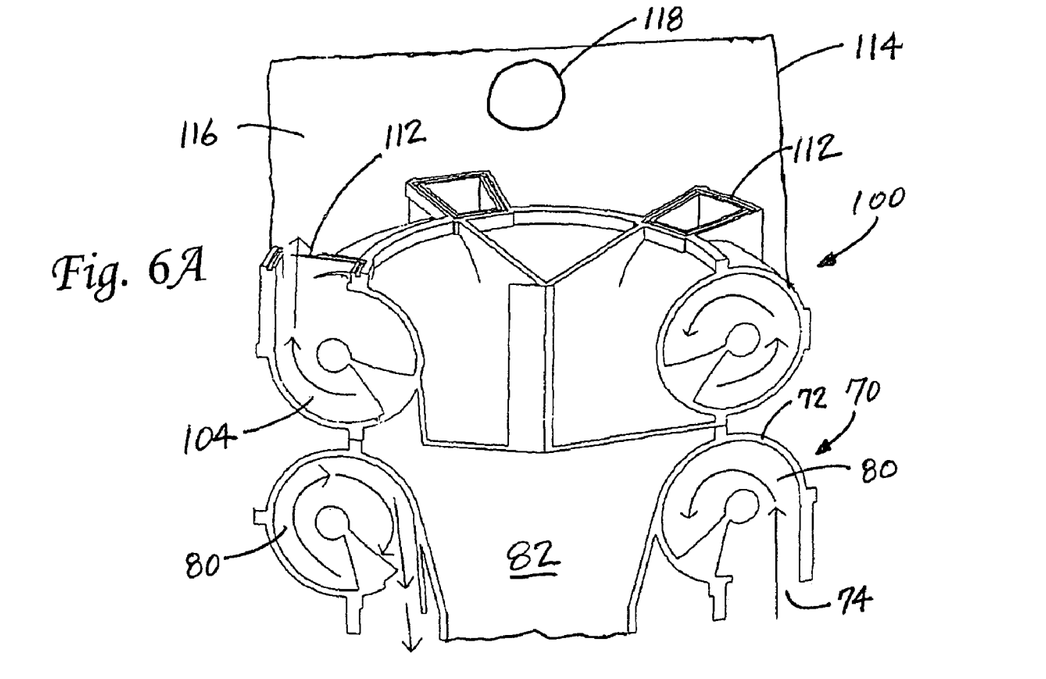
FIGS. 6A and 6B are detailed schematical cross sectional views illustrating air stream movement through the two groups of toroidal cyclones.
Figure 6B:
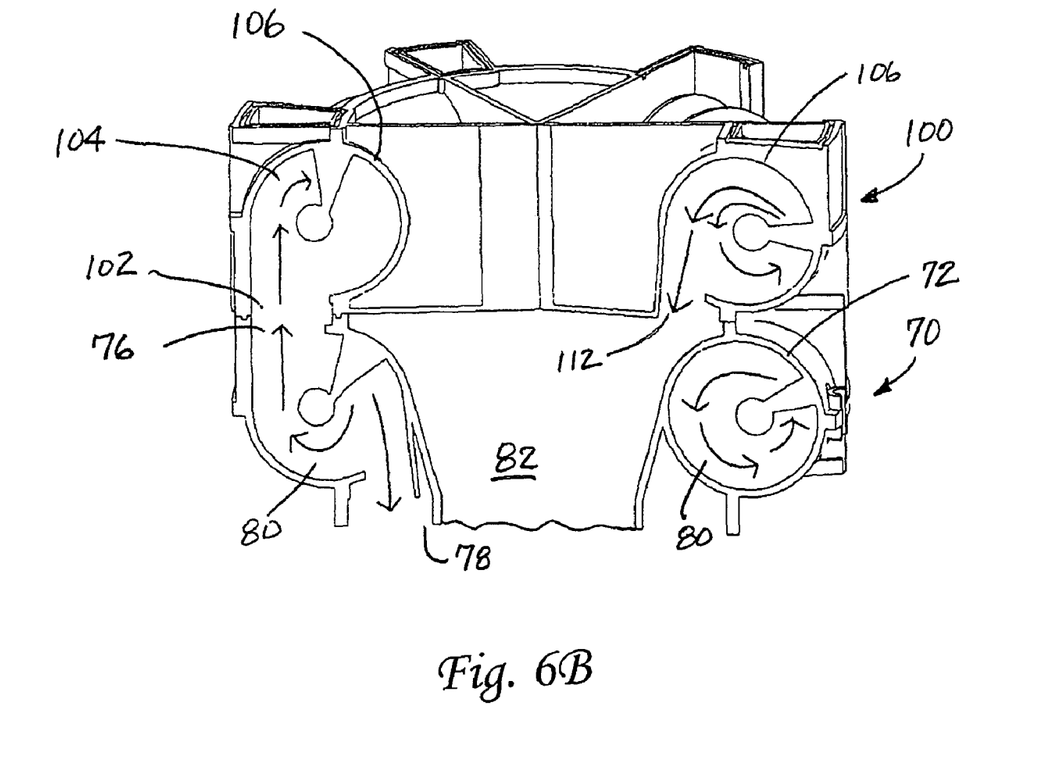

Yet another alternative embodiment of the present invention is illustrated in FIGS. 5, 6A and 6B. This additional embodiment includes a first group of toroidal cyclones 70 that are identical to and operate just as those described above with respect to the embodiment illustrated in FIGS. 2, 3 and 4A-4C. In addition, the dirt collection vessel 12 of this embodiment includes a second group of toroidal cyclones 100. The second group of toroidal cyclones 100 are all provided in parallel with one another but in series to the first group of cyclones 70. Accordingly, as best illustrated in FIGS. 6A and 6B, clean air passing through the outlet ports 76 of the first group of toroidal cyclones 70 is directed into the inlet ports 102 of the second group of toroidal cyclones 100. That air stream then travels along the spiral air paths defined by the cork screw baffles 104 received in each of the toroidal cyclones 100 of the second group of toroidal cyclones. This spiral, cyclonic-like air movement produces a centrifugal force on any remaining fine dust particles in the air stream, forcing those particles outwardly toward the outer wall 106 of the toroidal cyclone 100. Any such particles are swept through the particle outlets 108 and delivered through apertures 110 in the inner cylindrical wall 50 where they are deposited in the toroidal dirt collection chamber 84.

In contrast, the air stream now cleaned of these particles travels toward and through the outlet ports 112 of the second group of toroidal cyclones 100 where it is delivered into the chamber 114 of the discharge manifold 116. Subsequently, the air stream is drawn through the discharge outlet 118 whereby the air stream passes from the dirt collection vessel 12 and travels along duct work (not shown) to the suction generator 28 in the manner previously described with regard to the embodiment of FIGS. 2, 3 and 4A-4C.

It should be appreciated that anywhere from two to six toroidal cyclones 100 may be provided in the second group. The toroidal cyclones 100 of the second group may be identical in every respect to the toroidal cyclones 70 of the first group. Thus, each of the toroidal cyclones 70, 100 may have an inlet port having a cross sectional area of between about 2.7 cm$^2$ and about 3.3 cm$^2$, an outlet port having a cross sectional area of between about 2.7 cm$^2$ and about 3.3 cm$^2$ and a particle outlet having a cross sectional area of between about 1.0 cm$^2$ and about 2.0 cm$^2$. The cross sectional area of the spiraling air path in the toroidal cyclones 70, 100 may be equal. Alternatively, the spiral air path of each of the first group of toroidal cyclones 70 may have a cross sectional area $A_1$ while the spiral air paths of each of the toroidal cyclones 100 of the second group has a cross sectional area $A_2$ where $A_1$ is greater than $A_2$. In yet another alternative embodiment the cross sectional area of the spiraling air paths in the toroidal cyclones 70, 100 may decrease gradually from the inlet port 74, 102 to the outlet port 76, 112.

Figure 7:
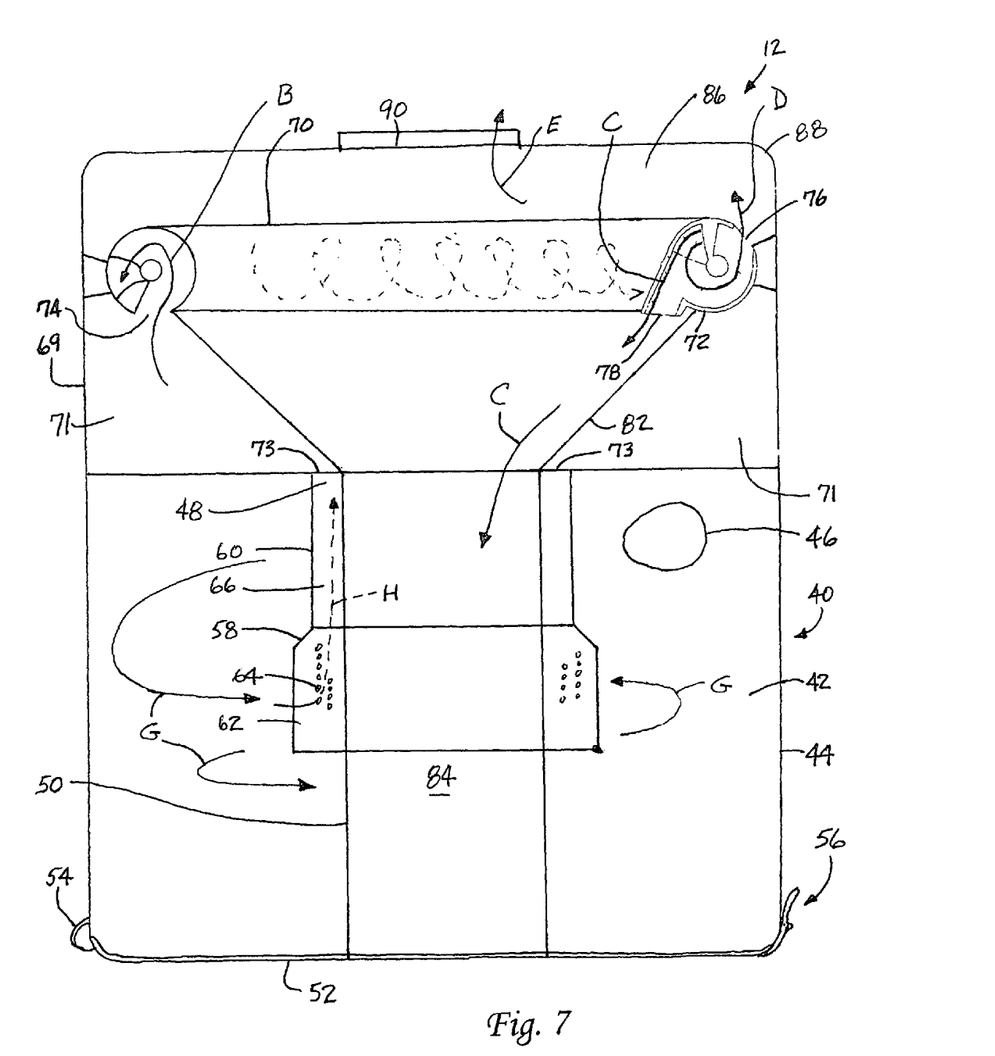
FIG. 7 is a side elevational view of an alternative dirt collection vessel including a primary cyclone and a down stream secondary cyclone including a group of toroidal cyclones.

In yet another alternative embodiment illustrated in FIG. 7, the dirt collection vessel 12 includes a primary cyclone, generally designated by reference numeral 40. Primary cyclone 40 includes a dirt collection chamber 42 having an outer or side wall 44 of substantially cylindrical shape, a tangentially directed inlet 46 and an axially directed 48. An inner cylindrical wall 50 is concentrically received within the outer side wall 44 so that the primary dirt collection chamber 42 is annular in shape. A bottom wall 52 closes the end of the dirt collection chamber 42. In the illustrated embodiment the bottom wall 52 is pivotally connected to the outer sidewall 44 by means of a hinge 54. A latching arrangement 56 of a type known in the art secures the bottom wall 52 in the closed position but may be manipulated by the operator to allow the bottom wall 52 to hinge open so that dirt and debris may be removed from the dirt collection vessel 12.

The axial outlet 48 of the dirt collection chamber 42 extends around the inner cylindrical wall 50 and is annular in shape. The outlet 48 is covered by shroud 58. The upper portion 60 of the shroud 58 provides a smooth, continuous cylindrical outer surface that is concentrically disposed between the inner cylindrical wall 50 and the outer or side wall 44. The lower portion 62 of the shroud 58 includes a series of apertures 64.

During vacuum cleaner operation, the suction generator 28 draws dirt and debris through the suction inlet 20. That dirt and debris is then conveyed by duct work (not shown) lo the tangentially directed inlet 46. The air stream with entrained dirt and debris then moves in a cyclonic air flow pattern through the dirt collection chamber 42 (note action arrows G). This air flow pattern creates centrifugal forces that force dirt and debris in the air stream outwardly toward the side wall 44. That dirt and debris then gradually falls downwardly toward the bottom of the dirt collection chamber 42 where it collects. Relatively clean air is then drawn through the apertures 64 of the shroud 58 and along the annular passageway 66 (see action arrow B) toward the axially directed outlet through which the airstream is directed into the toroidal cyclone generally designated by reference numeral 70.

Secondary cyclone 200 may comprise either of the toroidal cyclone embodiments illustrated in FIGS. 2, 3, 4A-4C or FIGS. 5, 6A, 6B. Particles separated from the air stream by the toroidal cyclones 70 or 70 and 100 are collected in the secondary dirt collection chamber 84.

The foregoing description of the preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed:

1. A vacuum cleaner, comprising:
    a body including (a) a nozzle assembly having a suction inlet and (b) a control assembly including a control stalk;
    a dirt collection vessel carried on said body, and
    a suction generator carried on said body, said suction generator drawing an airstream through said suction inlet, and said dirt collection vessel;
    said dirt collection vessel being characterized by:
    a toroidal cyclone having an inlet port, a clean air outlet port and a particle outlet provided in said toroidal cyclone between said inlet port and said outlet port; and
    a cork screw baffle received in said toroidal cyclone, said cork screw baffle defining a spiraling air path through said toroidal cyclone.

2. The vacuum cleaner of claim 1, further including a dirt collection chamber in fluid communication with said particle outlet of said toroidal cyclone.

3. The vacuum cleaner of claim 1, wherein said spiraling air path in said toroidal cyclone has a cross sectional area of between about 1.6 cm$^2$ and about 2.2 cm$^2$.

4. The vacuum cleaner of claim 1, including multiple toroidal cyclones where each of said multiple toroidal cyclones extends through an are of between about 50 and about 90 degrees.

5. The vacuum cleaner of claim 4, wherein said spiral air path of each of said toroidal cyclones has a cross sectional area of between about 1.6 cm$^2$ and about 2.2 cm$^2$.

6. The vacuum cleaner of claim 5, wherein (a) said inlet port of each of said toroidal cyclones has a cross sectional area of between about 2.7 cm$^2$ and about 3.3 cm$^2$; (b) said outlet port of each of said toroidal cyclones has a cross sectional area of between about 2.7 cm$^2$ and about 3.3 cm$^2$; and (c) said particle outlet of each of said toroidal cyclones has a cross sectional area of between about 1.0 cm$^2$ and about 2.0 cm$^2$.

7. The vacuum cleaner of claim 1, wherein a cross sectional area of said spiraling air path decreases from said inlet port to said outlet port.

8. The vacuum cleaner of claim 4, wherein said multiple toroidal cyclones are provided in parallel.

9. The vacuum cleaner of claim 4, wherein said toroidal cyclones are provided in series.

10. The vacuum cleaner of claim 4, wherein said multiple toroidal cyclones include a first group of toroidal cyclones provided in parallel with one another and a second group of toroidal cyclones provided in parallel with one another but in series with said first group of toroidal cyclones.

11. The vacuum cleaner of claim 10, wherein each of said toroidal cyclones extends through an are of between about 50 and about 90 degrees.

12. The vacuum cleaner of claim 10, wherein each of said toroidal cyclones extends through an arc of between about 50 and about 60 degrees.

13. The vacuum cleaner of claim 10, including four toroidal cyclones where each of said four toroidal cyclones extends through an arc of between about 80 and about 90 degrees.

14. The vacuum cleaner of claim 13, wherein said spiral air path of each of said toroidal cyclones has a cross sectional area of between about 1.6 cm$^2$ and about 2.2 cm$^2$.

15. The vacuum cleaner of claim 14, wherein (a) said inlet port of each of said toroidal cyclones has a cross sectional area of between about 2.7 cm$^2$ and about 3.3 cm$^2$; (b) said outlet port of each of said toroidal cyclones has a cross sectional area of between about 2.7 cm$^2$ and about 3.3 cm$^2$; and (c) said particle outlet of each of said toroidal cyclones has a cross sectional area of between about 1.0 cm$^2$ and about 2.0 cm$^2$.

16. The vacuum cleaner of claim 10, wherein said spiral air path of each of said first group of toroidal cyclones has a cross sectional area $A_1$, and said spiral air path of each of said second group of toroidal cyclones has a cross sectional area $A_2$ where $A_1$ is greater than $A_2$.

17. The vacuum cleaner of claim 1, wherein said dirt collection vessel further includes a primary cyclone separator upstream from said toroidal cyclone so that air flows through said primary cyclone before entering said toroidal cyclone.

* * * * *

UNITED STATES PATENT AND TRADEMARK OFFICE
CERTIFICATE OF CORRECTION

| | | |
|---|---|---|
| PATENT NO. | : 7,887,613 B2 | Page 1 of 1 |
| APPLICATION NO. | : 12/368524 | |
| DATED | : February 15, 2011 | |
| INVENTOR(S) | : Brian K. Ruben | |

It is certified that error appears in the above-identified patent and that said Letters Patent is hereby corrected as shown below:

Claim 11, column 6, line 59, please replace "are" with --arc--.

Signed and Sealed this
Nineteenth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,887,613 B2 | Page 1 of 1 |
| APPLICATION NO. | : 12/368524 | |
| DATED | : February 15, 2011 | |
| INVENTOR(S) | : Brian K. Ruben | |

It is certified that error appears in the above-identified patent and that said Letters Patent is hereby corrected as shown below:

Column 5, line 54, please delete "200".

Signed and Sealed this
Tenth Day of May, 2011

David J. Kappos
*Director of the United States Patent and Trademark Office*